United States Patent
King et al.

(10) Patent No.: US 6,769,302 B1
(45) Date of Patent: Aug. 3, 2004

(54) MEASURING CUP WITH REVERSED INDICIA

(75) Inventors: Kenneth E. King, Scottdale, PA (US); Michael R. Konsugar, Belle Vernon, PA (US); Adam Sprankle, Elizabeth, PA (US)

(73) Assignee: WKI Holding Company, Inc., Reston, VA (US)

( * ) Notice: Subject to any disclaimer, the term of this patent is extended or adjusted under 35 U.S.C. 154(b) by 0 days.

(21) Appl. No.: 10/375,863

(22) Filed: Feb. 26, 2003

Related U.S. Application Data

(63) Continuation-in-part of application No. 10/131,935, filed on Apr. 24, 2002, now abandoned.

(51) Int. Cl.⁷ ............................................. G01F 19/00
(52) U.S. Cl. ............................ 73/427; 73/426; D10/46; D10/46.2
(58) Field of Search ...................... 73/426–429; 33/1 V; D10/46, 6.2, 96, 101; 116/227, 327

(56) References Cited

U.S. PATENT DOCUMENTS

| | | | |
|---|---|---|---|
| 39,346 A | | 7/1863 | Hillman |
| 153,159 A | | 7/1874 | Dinwiddie |
| 217,050 A | | 7/1879 | Block |
| 258,035 A | * | 5/1882 | Eastman ............... 141/381 |
| 432,018 A | | 3/1890 | Young |
| 449,147 A | | 3/1891 | Welch |
| 598,891 A | * | 2/1898 | Barnekov ............... 73/427 |
| 679,628 A | * | 7/1901 | Lehmann ............... 73/427 |
| 925,582 A | | 6/1909 | Kipp |
| 1,105,114 A | | 7/1914 | Tsuru |
| 1,250,890 A | | 12/1917 | Johnson |
| 1,386,571 A | | 8/1921 | Jackson |
| 1,507,968 A | | 9/1924 | Johnson |
| 1,674,475 A | | 6/1928 | Loomis |
| 1,711,796 A | | 5/1929 | Knight |
| D99,405 S | | 4/1936 | Marschall |
| 2,165,045 A | | 7/1939 | Garside |
| 2,758,771 A | | 8/1956 | Bauer |
| D202,368 S | | 9/1965 | Feldman |
| D202,369 S | | 9/1965 | Feldman |
| 3,530,722 A | | 9/1970 | Miller |
| 3,636,360 A | | 1/1972 | Oishi et al. |
| 3,672,061 A | | 6/1972 | Alessi |
| 3,832,785 A | | 9/1974 | Miller |
| 3,881,102 A | | 4/1975 | Willits et al. |
| 3,931,741 A | | 1/1976 | Ceccarelli |
| 4,115,939 A | | 9/1978 | Marks |
| 4,262,535 A | | 4/1981 | Andersson |

(List continued on next page.)

FOREIGN PATENT DOCUMENTS

| FR | 2 766 692 | | 7/1997 | |
|---|---|---|---|---|
| JP | 61160024 A | * | 7/1986 | ............ G01F/19/00 |
| JP | 2000304590 A | * | 11/2000 | ............ G01F/19/00 |

*Primary Examiner*—Hezron Williams
*Assistant Examiner*—David A. Rogers
(74) *Attorney, Agent, or Firm*—Seyfarth Shaw LLP

(57) ABSTRACT

A vessel includes a wall structure formed of light-transmitting material and having inner and outer surfaces and defining a cavity with an open upper end for receiving contents having a measurable volume, and a indicia disposed on the outer surface and including reversed characters as to be readable by a user viewing the inner surface and providing a readily observable indication of the volume of the contents of the vessel. The wall structure may have a spout with the indicia disposed either beneath the spout. The wall structure may have a handle, with the indicia being disposed either beneath the handle or opposite the handle. The indicia may include plural spaced sets of indicia, some or all of which sets may include reversed characters. The indicia may be offset from their corresponding liquid surface levels to compensate for refraction.

11 Claims, 5 Drawing Sheets

U.S. PATENT DOCUMENTS

| | | |
|---|---|---|
| D268,158 S | 3/1983 | Doyel |
| 4,641,025 A | 2/1987 | Miller |
| 5,235,853 A | 8/1993 | Froes |
| 5,607,078 A * | 3/1997 | Nordberg et al. ........... 220/756 |
| D394,217 S | 5/1998 | Laib |
| 5,823,046 A | 10/1998 | Schagerström et al. |
| 5,863,431 A | 1/1999 | Salzburg |
| 5,966,214 A | 10/1999 | Imbrock et al. |
| 6,048,069 A | 4/2000 | Nagaoka et al. |
| 6,098,029 A | 8/2000 | Takagi et al. |
| D431,478 S | 10/2000 | Fortier |
| 6,212,953 B1 | 4/2001 | Bethune |
| 6,238,907 B1 | 5/2001 | Schuler-Maloney et al. |
| 6,263,732 B1 | 7/2001 | Hoeting et al. |
| 6,357,130 B1 | 3/2002 | Rank |
| 6,375,031 B1 | 4/2002 | Kwan |
| 2001/0042402 A1 | 11/2001 | Hoeting et al. |
| 2002/0029635 A1 | 3/2002 | Kremen |

\* cited by examiner

MEASURING CUP WITH REVERSED INDICIA

RELATED APPLICATION

This is a continuation-in-part of U.S. application Ser. No. 10/131,935, filed Apr. 24, 2002, now abandoned entitled "Measuring Cup With Reversed Indicia."

BACKGROUND

This application relates to vessels for containing measurable contents and, in particular, to vessels having graduated indicia to indicate the volume of contents in the vessel. The application relates in particular to measuring vessels.

Vessels such as cups, bowls, spoons and the like, which have a measuring capability, are known. Such devices can be made from a variety of materials, including plastic, metal and glass. One of the most common measuring vessels found on the market today is a transparent measuring cup sold under the trademark Pyrex®. Such measuring cups have a handle and a spout opposite the handle and are provided on the outer surface thereof with graduated indicia, typically located on the side wall of the vessel about midway between the handle and the spout. The device may, for example, have indicia graduated in ounces on one side of the vessel and indicia graduated in cups and fractions thereof on a diametrically opposite side of the vessel. In such traditional measuring vessels, the indicia may sometimes be difficult to read depending, for example, upon how precise a measurement is needed and the physical condition of the user. In order to read the indicia on the outer surface of the container, the user must typically either stoop down to the level of the container to view it or hold the container up at eye level. In the case of a transparent or translucent vessel, the indicia may be visible by viewing the inner surface of the vessel side wall, but the alphanumeric characters typically included in such indicia appear reversed and are difficult to read. While some people are capable of making the mental interpolation necessary to read the reversed characters, other persons may find it extremely difficult.

Also, measurement accuracy may be impaired because indicia on the outer surface of the vessel, when viewed from inside the vessel and above, may be distorted by refractions in the vessel wall and/or contents of the vessel.

While it is known to use graduated indicia on the inner surface of a measuring vessel, particularly in the case of vessels made of opaque materials, this may be undesirable because it brings the indicia into contact with the contents of the vessel, In this regard, it must be recognized that measuring vessels are not limited in their utility and application to the kitchen. They may also be used for measuring proper ratios of solutions, e.g., antifreeze, and various other household materials, such as cleaning materials and the like, some of which may be caustic, acidic or have other characteristics which may tend to rapidly degrade the indicia. Also, in the case of food products, the indicia may be worn off and could contaminate the food products.

SUMMARY

This application discloses a measuring vessel which avoids the disadvantages of prior measuring vessels while affording additional structural and operating advantages.

A significant aspect is the provision of a vessel which provides graduated indicia readable from the inside of the vessel without any risk of contamination of, or degradation by, the contents of the vessel.

Another aspect is the provision of a light-transmitting vessel which has indicia disposed on an outer surface thereof with reversed characters so as to be readable by a user viewing the inner surface thereof.

A further aspect is the provision of a vessel of the type set forth, which includes indicia readable from both the inside and the outside of the vessel.

A still further aspect is the provision of a vessel of the type set forth, which includes indicia readable through the vessel wall from above without adversely affecting measurement accuracy.

Yet another aspect is the provision of a vessel of the type set forth, which includes a handle and/or a spout, with indicia disposed under the handle and/or the spout.

Certain ones of these and other aspects may be attained by providing a vessel comprising a wall structure formed of a light-transmitting material and having inner and outer surfaces and defining a cavity with an open upper end for receiving contents having a measurable volume, and indicia disposed on the outer surface and including reversed characters so as to be readable by a user viewing the inner surface and providing a readily observable indication of the volume of the contents of the vessel.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
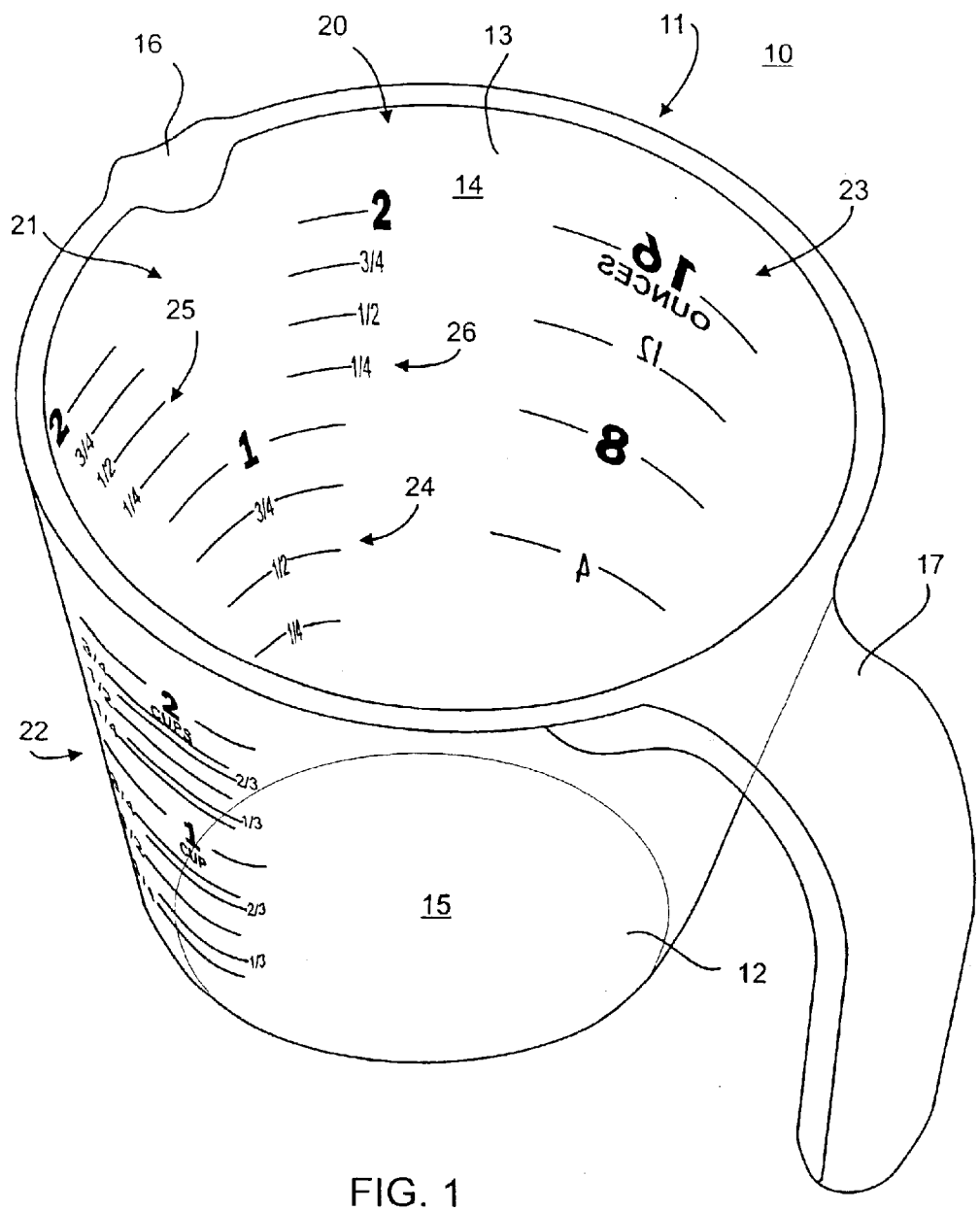
FIG. 1 is a perspective view of a measuring cup with indicia thereon in accordance with a first embodiment.

Referring to FIG. 1, there is shown a vessel in the nature of a measuring cup 10, having a unitary, one-piece wall structure 11 formed of a light-transmitting material and including a circular bottom wall 12 and a substantially frustoconical upstanding side wall 13, which has an inner surface 14 and an outer surface 15. Formed on the side wall 13 at the upper end thereof is a spout 16 and extending laterally outwardly and downwardly from the upper end of the side wall 13 at a location diametrically opposite the spout 16 is a handle 17. In the illustrated embodiment, the vessel is formed of a transparent glass, but it will be appreciated that other types of transparent or translucent materials, such as suitable plastics and the like, could be used.

The side wall 13 of the vessel 10 is provided on its outer surface 15 with graduated measurement indicia 20 arranged in three discrete sets 21, 22 and 23, respectively disposed at locations circumferentially spaced apart by about 90°. In particular, the set 21 is centered beneath the spout 16, the set 22 is centered about 90° to the left of the set 21 and the set 23 is centered about 90° to the right of set 21, as viewed in FIG. 1. The sets 21 and 22 of indicia are graduated in cups and fractions thereof, while the set 23 of indicia is graduated in ounces. As can be seen from FIG. 1, the set 21 of indicia, while applied to the outer surface of the side wall 13, is designed so as to be correctly readable from the inside of the wall structure 11, i.e., it is reverse printed on the outer surface 15 so that, if viewed from the outer surface, it would appear reversed, with each character reversed and with characters arranged right to left, as in a mirror image. The sets 22 and 23, on the other hand, are designed to be readable correctly from the outside of the vessel 10. Thus, as can be seen in FIG. 1, the set 23, when viewed from the inside of the vessel 10, appears reversed. It can be seen that the set 21 of indicia has a generally Y-shaped arrangement, including a base stem portion 24 and upwardly diverging arm portions 25 and 26. This is so that indicia will not be applied on the region of the side wall 13 immediately beneath the spout 16, the outer surface of which could be somewhat distorted during the formation of the spout.

Figure 2:
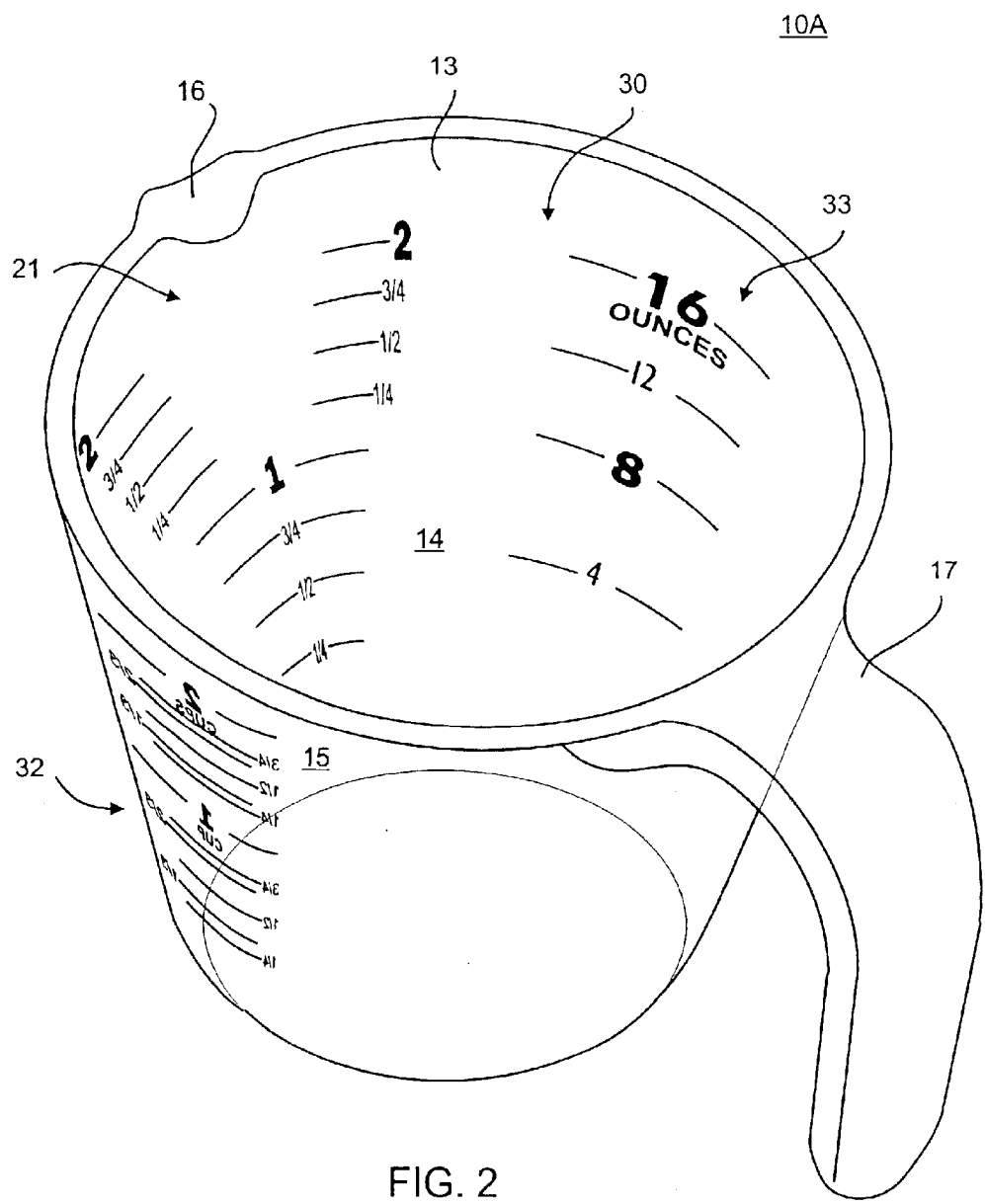
FIG. 2 is a view similar to FIG. 1, including indicia in accordance with a second embodiment.

Referring to FIG. 2, there is illustrated a vessel 10A which is substantially the same as the vessel 10 of FIG. 1, except that it bears indicia 30 on the outer surface 15 of the side wall 13. The indicia 30 are substantially the same as the indicia 20 on the vessel 10 of FIG. 1, except that the sets 22 and 23 have, respectively, been replaced by sets 32 and 33 which include the same characters as the sets 22 and 23, but the sets 32 and 33 are both reverse printed, so that they are readable from inside the vessel 10.

Figure 3:
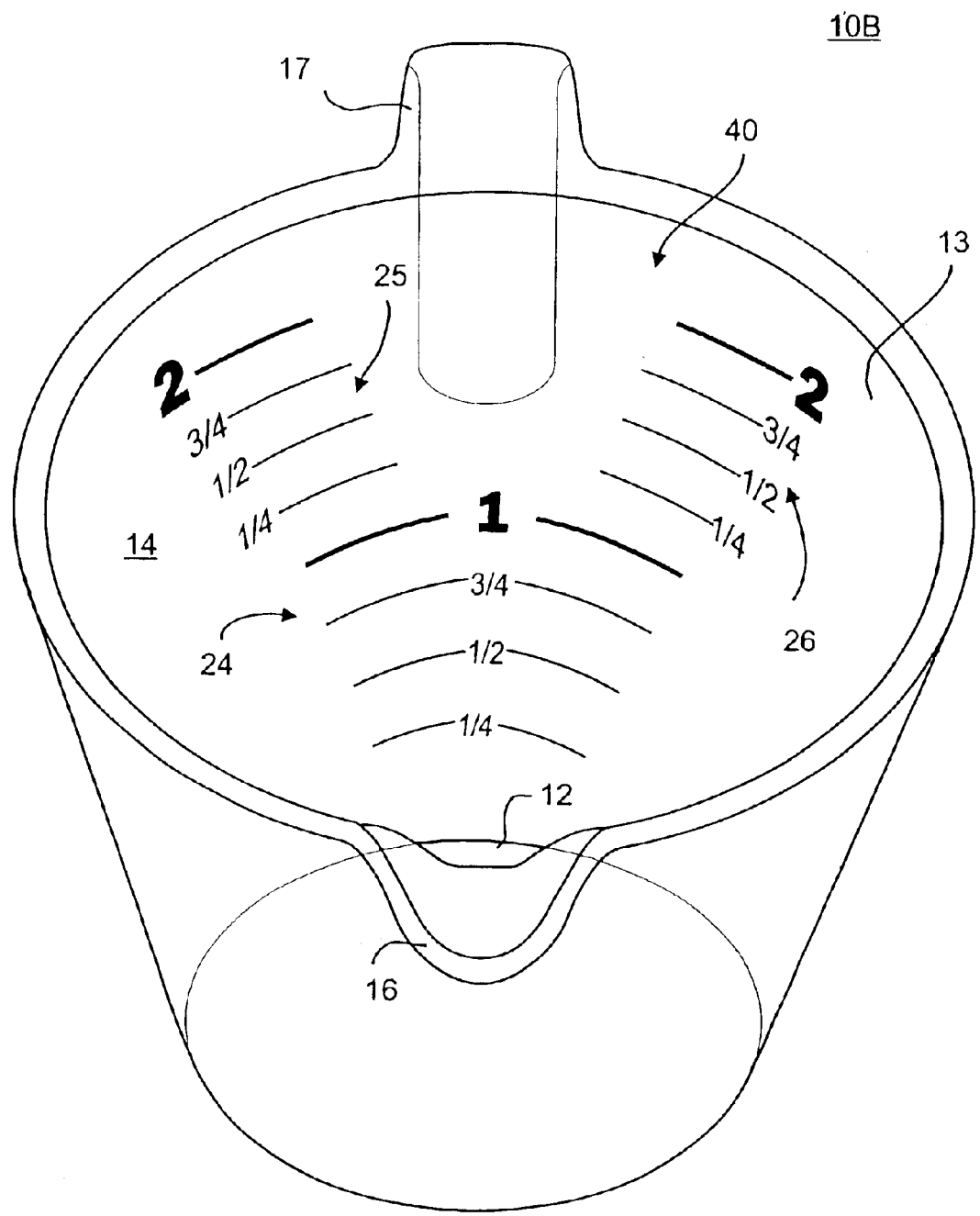
FIG. 3 is a perspective view of a measuring cup bearing indicia in accordance with a third embodiment.

Referring now to FIG. 3, there is illustrated a vessel 10B which is substantially the same as the vessel 10 of FIG. 1, except that it bears on the outer surface 15 a single set of indicia 40, which is substantially identical to the set 21 of indicia of FIG. 1, except that it is disposed beneath the handle 17 rather than beneath the spout 13. Again, the generally Y-shaped arrangement of the set of indicia 40 avoids any distortion in the outer surface 15 of the side wall 13 which may occur immediately beneath the region where the handle 17 joins the side wall 13.

While specific arrangements of indicia have been illustrated in FIGS. 1–3, it will be appreciated that other arrangements could be used. For example, two of the sets 21–23 could be reverse printed so as to be readable from the inside of the vessel 10. Also other numbers of sets of indicia could be provided and different units of measurements could be utilized.

It is significant that the generally Y-shaped configuration of the sets 21 and 40 of indicia permits them to be disposed beneath the spout and/or beneath the handle, without risk of any distortion of any of the indicia. This affords a significant advantage, since in certain applications it may be easier or more desirable to view the indicia in those positions.

Figure 4:
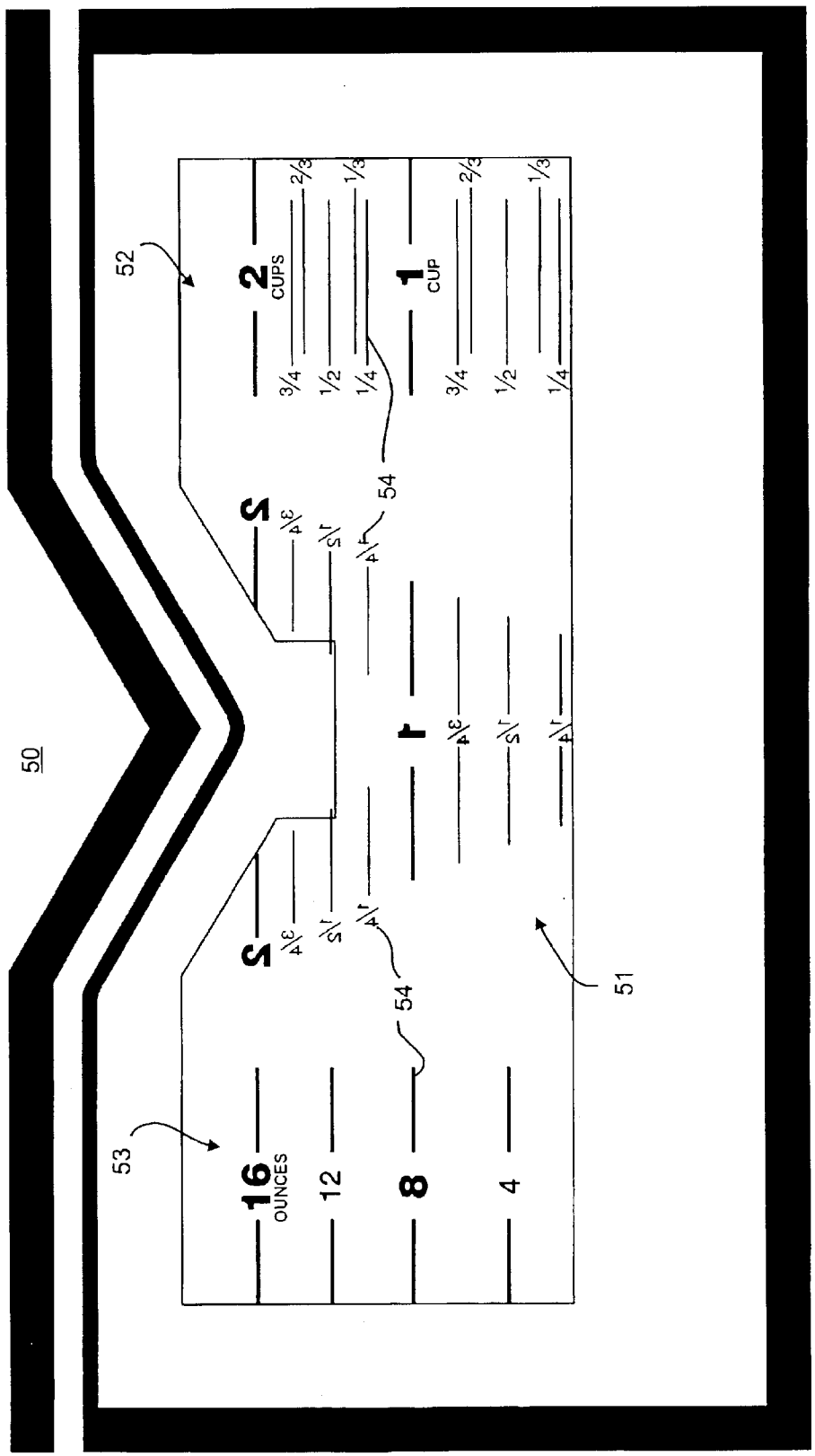
FIG. 4 is a plan view of a screen which may be used to form the indicia on the vessel of FIG. 1.

Referring now to FIG. 4, there is illustrated a plan view of a screen 50 of a type which could be utilized in imprinting the indicia 20 on the vessel 10. The screen 50 is in the nature of a thin, flexible, flat sheet, which may be formed of any suitable material, preferable a relatively non-porous and non-absorbent material. The screen 50 has formed therein three sets 51, 52 and 53 of apertures, respectively corresponding to the indicia sets 21, 22 and 23. The screen 50 is utilized as a guide for applying, in liquid form, suitable indicia material, such as dyeing, painting or etching material, to the outer surface 15 of the side wall 13. In this regard, the vessel 10 could be mounted in a suitable fixture (not shown) for rolling engagement with the outer surface of a rotatable roller (not shown) disposed for communication with a source of the liquid material. The fixture and the roller could be so arranged that the roller and the vessel move relative to each other so that the roller is effectively rotating around the outer surface 15 of the side wall 13, and so that the rotational axis of the roller lies in the same plane as the central axis of the vessel 10, but is substantially parallel to the contact line along the outer surface 15 of the side wall 13. As the roller and the vessel 10 are simultaneously moved, the screen 50 is fed therebetween, blocking the liquid material from contacting the outer surface 15 of the side wall 13, except in the regions of the apertures of the indicia sets 51–53, so that only those indicia are applied to the outer surface 15 of the side wall 13. It will be appreciated, however, that other techniques for applying indicia to the outer surface of the side wall 13 could be utilized.

While the illustrated embodiments are all measuring cups of a 2-cup capacity, it will be appreciated that the techniques described above could be utilized for any size measuring cup. Similarly, these techniques could be utilized for other types of measuring vessels. While transparent glass vessels have been described, since these afford clearest visibility through the thickness of the vessel side wall 13, it will be appreciated that other light-transmitting constructions, such as translucent wall structures, could be utilized. Also, while the illustrated vessels are formed of a clear material, they could be tinted or colored, if desired. While glass is the preferred material, other types of translucent or transparent materials, such as suitable plastics or the like, could be utilized.

Figure 5:
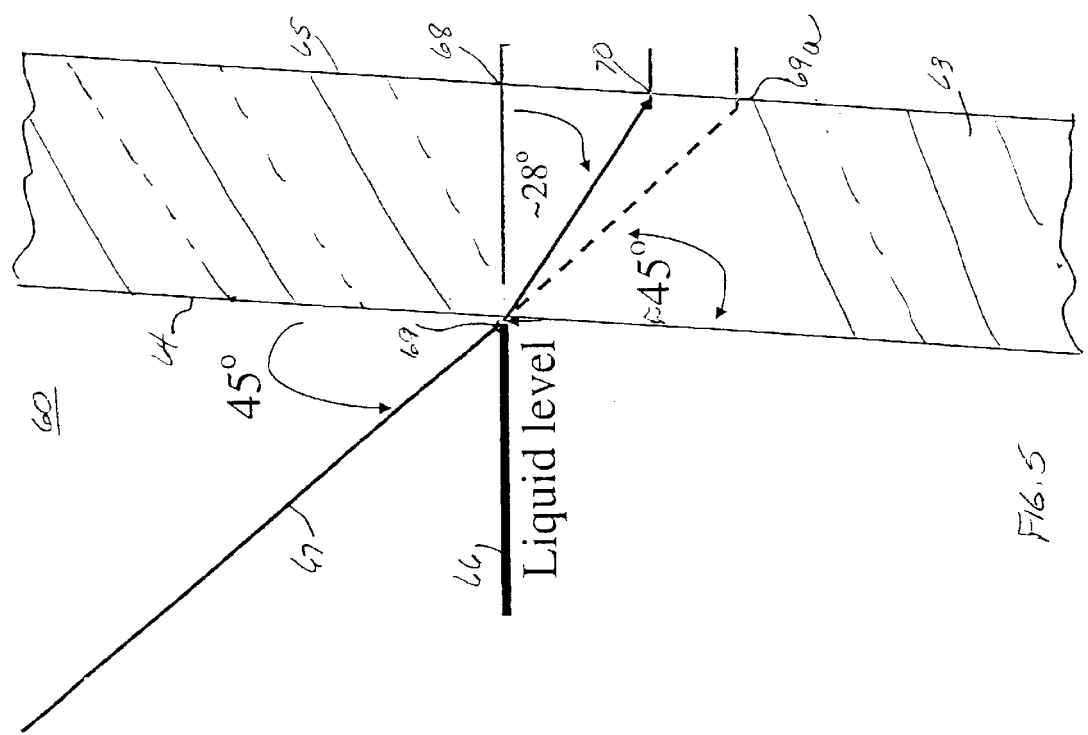
FIG. 5 is an enlarged, fragmentary, sectional view of a portion of a vessel wall of another embodiment.

Referring to FIG. 5, there is illustrated a portion of a measuring vessel 60, which may be substantially the same as the vessel 10, described above, except for the placement of the indicia, as will be explained more fully below. The vessel 60 has a wall structure including a side wall 63, illustrated in FIG. 5 in greatly enlarged cross section, the side wall 63 having an inner surface 64 and a substantially parallel outer surface 65. In the illustrated embodiment, the side wall 63 is slightly frustoconical so that, in use, the surfaces 64 and 65 are inclined at a slight angle to the vertical. The vessel 60 is illustrated as having its bottom wall (not shown) resing on a substantially horizontal support surface, so that the level of the surface of a body of liquid contained in the vessel 60 is designated by a substantially horizontal line 66. In prior measuring vessels, and in the measuring cups of FIGS. 1–3, each volume indicium or marking is disposed in horizontal alignment with the position of the liquid surface level for a body of liquid of the corresponding volume stored in the vessel. Thus, for example, if, in FIG. 5, the liquid level 66 corresponds to a volume of one cup, the "one cup" indicium or marking would be disposed on the outer surface 65 at the location 68, substantially coplanar with the liquid level 66. This, of course, works well when the indicia are read from from the side, with the viewer's eye level being substantially at the liquid level.

However, in the vessel of FIGS. 1–3, wherein reversed indicia on the outer surface of the vessel are adapted to be read from inside the vessel, such indicia must necessarily be read from above. Thus, for example, referring to FIG. 5, a user's line of sight may typically be along a line 67, inclined at an angle of approximately 45° to the plane of the liquid level 66. In the illustrated example, the line of sight 67 passes through the point 69, at which the liquid level 66 intersects the inner surface 64 of the side wall 13 on the side wall 63. As can be seen, this line of sight, extended through the thickness of the side wall 63, would intersect the outer surface 65 at point 69a. However, because of the difference in the indicies of refraction of air and the material of the vessel side wall 63 (typically glass), a ray of light along the line of sight 67 does not pass through the side wall 63 along the dotted line to the point 69*a* but, rather, will be refracted, so as to exit the outer surface 65 at the point 70. Thus, the point 69 will appear to the viewer to be substantially below the location of the indicium 68 designating the one-cup volume. In order for the liquid level to appear to the viewer to be at the indicium level 68, the liquid level would actually have to be raised substantially so that, while it would appear to the viewer that it coincided with the one-cup marking level, the vessel would actually contain substantially more than one cup. In order to compensate for this distortion, the vessel 60 of FIG. 5 places the "one cup" indicium at the point 70, so as to coincide with the apparent location of the liquid level 66 when viewed along the line of sight 67. It will be appreciated that other indicia for other volumes would be similarly relocated, so as to coincide with the apparent positions of the liquid levels for corresponding volumes. Accordingly, the viewer will be able to accurately ascertain the volume of liquid in the vessel, despite viewing the contents and the indicia from above and through the thickness of the side wall 63.

It will be appreciated that, given the slight measurement error that user's of measuring cups are typically willing to accept, it has been determined that the offset locations of the indicia can be placed in accordance with an average viewing angle and will give substantially accurate results for viewing angles within a predetermined acceptable range of that average angle. In the actual illustrated embodiment, if it is assumed that the line of sight 67 is inclined at a viewing angle of a substantially 45° from the inner surface 64, and that the side wall 63 has a thickness of a substantially 0.2 inch, and given an index of refraction for air of 1.0002926 and an index of refraction for glass of 1.51714, the angle between the plane of the liquid level 66 and the refracted line of sight is approximately 28° and the distance between the points 68 and 70 is given by 0.2×tan 28°, or approximately 0.106 inch. Thus, for a glass vessel with that wall thickness, it has been found that the standard indicia positions can be shifted downward approximately ⅛ inch and give reasonably accurate measurements for typical viewing angles. It will be appreciated that, for other side wall thicknesses and other materials, the determination of the appropriate positions of the offset indicia 70 can be determined by similar techniques.

From the foregoing, it can be seen that there has been provided a light-transmitting vessel which bears indicia on its outer surface which can be correctly read from inside the vessel, and which may be disposed beneath a spout and/or handle of the vessel without distortion.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A vessel comprising:

a wall structure formed of a light-transmitting material and having inner and outer surfaces and defining a cavity with an open upper end for receiving contents having a measurable volume, the wall structure having an upstanding side wall portion, a spout defined by a deformed portion of the side wall portion, and indicia disposed on the outer surface of the side wall portion and including reversed alphanumeric characters so as to appear backwards to a user viewing from the outer surface and so as to be readable through the wall structure by a user viewing the inner surface and providing a readily observable indication of the volume of contents of the vessel, the indicia including vertically spaced markings respectively designating different volumes, the markings being respectively vertically offset from contents levels corresponding to the designated volumes by distances such that, when viewed from above, the markings will appear to be substantially at their corresponding contents levels despite refraction in the vessel wall structure, the indicia including indicia disposed adjacent to the spout and arranged in a generally Y-shaped pattern with a stem portion disposed beneath and in substantially vertical alignment with the spout and branch portions extending respectively along opposite sides of the spout outside the deformed portion.

2. The vessel of claim 1, wherein the wall structure is self-supporting.

3. The vessel of claim 1, wherein the wall structure includes a bottom wall, the upstanding side wall portion being integral with the bottom wall.

4. The vessel of claim 3, wherein the side wall potion is substantially frustoconical in shape.

5. The vessel of claim 1, wherein the wall structure is transparent.

6. The vessel of claim 1, wherein the indicia include plural sets of indicia.

7. The vessel of claim 6, wherein a vertical center line of each set is spaced from a vertical center line of the closest adjacent set by about 90°.

8. The vessel of claim 6, wherein the side wall portion includes a handle extending laterally therefrom, the indicia being disposed beneath the handle.

9. The vessel of claim 6, wherein the indicia in at least one of the sets include reversed alphanumeric characters.

10. The vessel of claim 6, wherein the indicia in each of the sets include reversed alphanumeric characters.

11. The vessel of claim 1, wherein the side wall portion includes a handle extending laterally therefrom and disposed substantially diametrically opposite the spout.

\* \* \* \* \*

UNITED STATES PATENT AND TRADEMARK OFFICE
CERTIFICATE OF CORRECTION

PATENT NO. : 6,769,302 B1 Page 1 of 1
DATED : August 3, 2004
INVENTOR(S) : King et al.

It is certified that error appears in the above-identified patent and that said Letters Patent is hereby corrected as shown below:

Column 6,
Line 38, "potion" should be -- portion --.

Signed and Sealed this

Twenty-eighth Day of June, 2005

JON W. DUDAS
*Director of the United States Patent and Trademark Office*